United States Patent [19]

Janse et al.

[11] Patent Number: 5,754,846
[45] Date of Patent: May 19, 1998

[54] METHOD OF STORING A TOPOLOGICAL NETWORK, AND METHODS AND APPARATUS FOR IDENTIFYING SERIES OF 1-CELLS IN A NETWORK STORED BY SUCH A METHOD

[75] Inventors: Cornelis P. Janse; Leonardus M. H. E. Driessen, both of Eindhoven, Netherlands

[73] Assignee: U.S. Philips Corporation, New York, N.Y.

[21] Appl. No.: 769,613

[22] Filed: Oct. 1, 1991

[30] Foreign Application Priority Data

Oct. 1, 1990 [EP] European Pat. Off. .............. 90202587

[51] Int. Cl.$^6$ .................................................. G06F 17/30
[52] U.S. Cl. .................. 395/611; 395/615; 364/449.1; 364/449.4; 364/449.5; 340/990; 340/995
[58] Field of Search ....................... 364/443, 444, 364/448, 420, 449, 449.1, 449.4, 449.5; 365/189.01, 600; 395/800, 325, 611, 615; 340/990, 995

[56] References Cited

U.S. PATENT DOCUMENTS

| | | | |
|---|---|---|---|
| 4,689,747 | 8/1987 | Kuvose et al. ...................... | 364/449 |
| 4,737,916 | 4/1988 | Ogawa et al. ...................... | 364/443.73 |
| 4,888,698 | 12/1989 | Driesen ............................... | 364/443 |
| 4,954,986 | 9/1990 | Driessen ............................. | 365/189.01 |
| 4,962,458 | 10/1990 | Verstraete .......................... | 364/443 |
| 5,150,295 | 9/1992 | Mattingly .......................... | 364/420 |
| 5,159,556 | 10/1992 | Shorter .............................. | 364/449.4 |
| 5,170,353 | 12/1992 | Verstraete .......................... | 364/444 |
| 5,177,685 | 1/1993 | Davis et al. ....................... | 364/443 |
| 5,187,667 | 2/1993 | Short ................................. | 364/443 |

OTHER PUBLICATIONS

Tajarn, Robert E., "Algorithm Design", *Communications of the ACM*, Mar. 1987, vol. 30, No. 3, pp. 204–213.
M.L.G. Thoone, "CARIN, a car information and navigation System", Philips Techical Review, vol. 43, No. 11/12, Dec. 1987.

Primary Examiner—Paul R. Lintz
Attorney, Agent, or Firm—Anne E. Barschall

[57] ABSTRACT

A topological network, comprising a set of 0-cells (nodes) (28, 29) interconnected by a set of 1-cells (aa, bb, . . . , gg)$_1$ is divided into sections (E, F, G) corresponding to discrete parcels of data for storage in a mass memory such as a CD-ROM. A boundary node (28, 29) is defined at each point where the network traverses a boundary between sections. The parcel of data for a given section includes a chain list record for each 1-cell in the section, which chain list record generally refers directly (TP) to a further 1-cell in the network terminating at the same node. However, no chain list record refers directly to a 1-cell outside the section of the network to which the data parcel relates. An indirect reference (0-C') across the section boundary can be made easily, while an overall saving in data volume is obtained compared with a known method. Further information can be introduced into the data parcels by ordering techniques, enabling the network data to be used in a particularly efficient and systematic manner.

20 Claims, 5 Drawing Sheets

| w | 26 | NIL | 8 | x |
|---|----|-----|---|---|
| n | 27 | NIL | 6 | r |
| x | 8 | s | 23 | NIL |
| r | 6 | t | 8 | w |
| s | 8 | r | 7 | u |
| t | 6 | q | 7 | s |
| q | 6 | n | 16 | NIL |
| u | 7 | v | 18 | NIL |
| v | 7 | t | 17 | NIL |

| 26 | w | C,26 |
|----|---|------|
| 27 | n | C,27 |
| 16 | q | ?,16 |
| 17 | v | ?,17 |
| 18 | u | ?,18 |
| 23 | x | B,23 |

| 6 | r |
|---|---|
| 7 | u |
| 8 | s |

| 1-C | L | | R | |
|---|---|---|---|---|
| | 0-C | TP | 0-C | TP |
| a | 11 | NIL | 1 | b |
| b | 1 | c | 21 | NIL |
| c | 1 | a | 3 | f |
| d | 12 | NIL | 2 | e |
| e | 2 | h | 3 | c |
| f | 3 | g | 22 | NIL |
| g | 3 | e | 24 | NIL |
| h | 2 | d | 25 | NIL |

FIG. 3A

| f | 22 | NIL | 9 | z |
|---|---|---|---|---|
| x | 23 | NIL | 9 | f |
| y | 9 | x | 19 | NIL |
| z | 9 | y | 20 | NIL |

FIG. 3B

| j | 13 | NIL | 4 | h |
|---|---|---|---|---|
| k | 4 | m | 10 | g |
| l | 14 | NIL | 5 | m |
| m | 4 | j | 5 | n |
| n | 5 | p | 27 | NIL |
| p | 5 | l | 15 | NIL |
| g | 24 | NIL | 10 | w |
| w | 10 | k | 26 | NIL |
| h | 25 | NIL | 4 | k |

FIG. 3C

| w | 26 | NIL | 8 | x |
|---|---|---|---|---|
| n | 27 | NIL | 6 | r |
| x | 8 | s | 23 | NIL |
| r | 6 | t | 8 | w |
| s | 8 | r | 7 | u |
| t | 6 | q | 7 | s |
| q | 6 | n | 16 | NIL |
| u | 7 | v | 18 | NIL |
| v | 7 | t | 17 | NIL |

FIG. 3D

| O-C | TB | O-C' |
|---|---|---|
| 11 | a | ?,11 |
| 12 | d | ?,12 |
| 25 | h | C,25 |
| 24 | g | C,24 |
| 22 | f | B,22 |
| 21 | b | ?,21 |
| 1 | b | |
| 2 | e | |
| 3 | f | |

FIG. 4A

| | | |
|---|---|---|
| 22 | f | A,22 |
| 23 | x | D,23 |
| 19 | y | ?,19 |
| 20 | z | ?,20 |
| 9 | z | |

FIG. 4B

| O-C | TB | O-C' |
|---|---|---|
| 13 | j | ?,13 |
| 14 | l | ?,14 |
| 15 | p | ?,15 |
| 27 | n | D,27 |
| 26 | w | D,26 |
| 24 | g | A,24 |
| 25 | h | A,25 |
| 4 | k | |
| 5 | n | |
| 10 | w | |

FIG. 4C

| | | |
|---|---|---|
| 26 | w | C,26 |
| 27 | n | C,27 |
| 16 | q | ?,16 |
| 17 | v | ?,17 |
| 18 | u | ?,18 |
| 23 | x | B,23 |
| 6 | r | |
| 7 | u | |
| 8 | s | |

FIG. 4D

METHOD OF STORING A TOPOLOGICAL NETWORK, AND METHODS AND APPARATUS FOR IDENTIFYING SERIES OF 1-CELLS IN A NETWORK STORED BY SUCH A METHOD

FIELD OF THE INVENTION

The invention relates to a method of storing digital data representing a topological network, the network comprising a set of 0-cells (nodes) and a set of 1-cells and being divided into sections corresponding to discrete parcels of data for storage in a mass memory, a boundary node being defined at each point where the network traverses a boundary between sections, the parcel of data for a given section including a chain list record for each 1-cell in the section, which chain list record, at least in the case of a 1-cell terminating at a non-boundary node, refers to a further 1-cell in the network terminating at the same node.

The invention further relates to a mass memory device wherein are stored data in accordance with such a method and to methods and apparatus for using such data.

BACKGROUND OF THE INVENTION

Methods and apparatus as set forth above are described in the context of a road vehicle navigation system in EP-A1-0 306 075. An overview of the same navigation system is given in the article "CARIN, a car information and navigation system" by M. L. G. Thoone, published in Philips Technical Review, Volume 43, No. 11/12, December 1989, pages 317 to 329.

In the known system the chain list records for a given section identify 1-cells in neighbouring sections where the 1-cell terminates at a boundary node. This simplifies the task for the in-car apparatus in following a series of 1-cells that form a desired route, even across section boundaries. In many applications it will be preferable to concentrate the processing effort into the compilation of the database, so as to simplify (make cheaper) the use of the database. In a mass market application such as car navigation, this philosophy can exploit fully the properties of a cheap, very high density, but essentially read-only storage medium such as the Compact Disc.

Unfortunately, the need to identify 1-cells in neighbouring sections results in the chain list records occupying a large amount of memory space in the data parcels. This large memory space does not convey a correspondingly large amount of information, since only a small minority of the 1-cells referred to are outside the given section.

It is an aim of the present invention to reduce the volume of the network data, while at the same time maintaining or improving the information content. It is a further aim of the invention to enable and provide methods and apparatus for retrieving the stored data in an efficient manner.

SUMMARY OF THE INVENTION

The invention provides a method of storing data representing a topological network as set forth in the opening paragraph, characterized in that no chain list record in a data parcel refers directly to a 1-cell outside the section of the network to which the data parcel relates. In such a method, the chain list records need only identify 1-cells uniquely within one section, and can consequently take up less space. Although a certain amount of information has been lost from the chain list records, this can be replaced elsewhere with an overall saving in memory size.

In one embodiment of the invention, the data parcel for a given section of the network includes a node list record for each node cell in the section, and wherein the node list record for a boundary node in a given section includes a reference to a corresponding node in an adjacent section, and a thread pointer referring to a 1-cell in the given section, but also no direct reference to any 1-cell outside the given section. In this embodiment, there is no need at all to refer directly to 1-cells outside a given section in the topological description of that section, allowing a shorter reference for every 1-cell in the node list records as well as in the chain list records. A node list record for a non-boundary node will already include a reference (thread pointer) to a 1-cell within the section, in accordance with the known method. The only direct reference between sections becomes that between nodes.

The reference to the corresponding node may be an additional field in a longer node list record. While variable-length records are in general undesirable, it should be noted that the longer records (for boundary nodes) and the shorter records (for non-boundary nodes) can be grouped together, to minimize this inconvenience. Variable length chain list records could not be grouped so conveniently, since each refers in practice to two further 1-cells so that four different record formats would be required, depending on whether a 1-cell is terminated by zero, one or two boundary nodes.

In the above embodiment, the chain list record for a 1-cell may include references to a first and a second node cell which terminate the 1-cell and may further include corresponding first and second thread pointers each indicating a further 1-cell terminated by the first or second node cell respectively, except that where a node cell referred to in a chain list record is a boundary node and no further 1-cell in the same section remains to be indicated, the space allocated for the thread pointer is occupied by a special pointer indicating that the node cell is a boundary node. The special pointer conveys only the information that the node is a boundary node, but it is a simple matter to identify the corresponding node in the adjacent section from the node list record for that node, and then to use the thread pointer in the node list record in the adjacent section to identify the further 1-cell beyond the section boundary.

In such an embodiment the further 1-cell indicated by each thread pointer in a chain list record may be chosen systematically by following a particular sense of rotation about the corresponding node, while the thread pointer in the node list record for each boundary node indicates the first 1-cell within the section, counting from the section boundary in the particular sense of rotation about the boundary node. Rotational ordering of 1-cell references is used in the known method to simplify following routes through the network. The embodiment described provides consistency of the rotational ordering across section boundaries, even though no direct references to 1-cells outside the given section are included in the data parcel for that section.

For a boundary node located on the boundary of three or more sections, the node list record may refer to the corresponding boundary node only in the section following next in the particular sense of rotation. This avoids the need to refer in the node list record to more than one corresponding node even though there may be any number of them, and the rotational ordering is again achieved in a manner consistent with that adopted in the known system. Such consistency allows the existing methods of finding routes through the network to be used reliably with the new database, with only a minor modification.

Information may be included in the data parcel linking the boundary nodes of a section in accordance with the sense of rotation opposite to the particular sense of rotation according to which the 1-cells are indicated by the thread pointers. Such information is useful for example when it is desired to truncate a 2-cell (area between 1-cells) using the section boundary. The information can be included with no increase in the amount of data, simply by ordering the node list records for the boundary nodes in accordance with the opposite sense of rotation. This is another example of how processing at the time of compiling the network database can both increase the information content of the database and simplify the use of the database.

The invention further provides a method of identifying a further 1-cell, given a current 1-cell and a direction of traversing that 1-cell in a topological network section represented by a data parcel stored in a mass memory in accordance with the invention as set forth above, the method comprising the steps of:

(a) finding in the chain list record for the current 1-cell the terminating node in the given direction of traversing the 1-cell; and (b) looking in that chain list record for a reference to a further 1-cell leading from said terminating node;

wherein, in a case where the terminating node is a boundary node and, in step (b), the chain list record is found to contain no direct reference to a further 1-cell leading from the boundary node, a step (b1) is performed which comprises using information outside the chain list record to find a reference to a further 1-cell in an adjacent section of the network.

The invention yet further provides methods of identifying a series of 1-cells which form a route through a topological network stored in accordance with the invention as set forth above, or which bound a particular 2-cell in the network. Such methods may exploit some or all of the rotational ordering features described above.

The invention yet further provides a mass memory device wherein are stored data parcels representing sections of a topological network in accordance with a method of the invention.

The invention yet further provides an apparatus for reading a topological database stored in a mass memory device in accordance with the invention as set forth above, the apparatus comprising:

means for reading from a mass memory device a first data parcel representing a first section of a topological network;

means for reading from the data parcel a chain list record corresponding to a 1-cell in the first section of the network, which chain list record, for a given node terminating the 1-cell, may or may not refer directly to a further 1-cell in the first section which is also terminated by that node;

means responsive to the reading of a chain list record which does not refer directly to such a further 1-cell for using information outside the chain list record for the node to identify an adjacent second section of the network; and means for reading a second data parcel for the second section of the network and for using information in the second data parcel to identify a further 1-cell leading from the corresponding boundary node into the second section of the network.

Any or all of these means may conveniently comprise a processing device operating under control of program instructions read from the same mass memory device in which the network data parcels are stored.

BRIEF DESCRIPTION OF THE DRAWINGS

Embodiments of the invention will now be described, by way of example, with reference to the accompanying drawings, in which:

FIG. 3A to 3D show four chain lists corresponding to respective sections of the network of FIG. 2;

FIG. 4A to 4D show four node lists corresponding to respective sections of the network of FIG. 2;

FIG. 1 shows the components of a navigation system for a car. A microprocessor 102, a working memory 103 and a mass memory 104 communicate with one another via a bus 101. The working memory 103 comprises semiconductor memory with capacity of, for example 1 Mbyte. The mass memory 104 comprises in this example a Compact Disc Read-Only Memory (CD-ROM). The CD-ROM 104 has a capacity of approximately 600 Mbytes, in which are stored programs for controlling the microprocessor 102 and a database describing the road network of a country or other large area.

Figure 1:
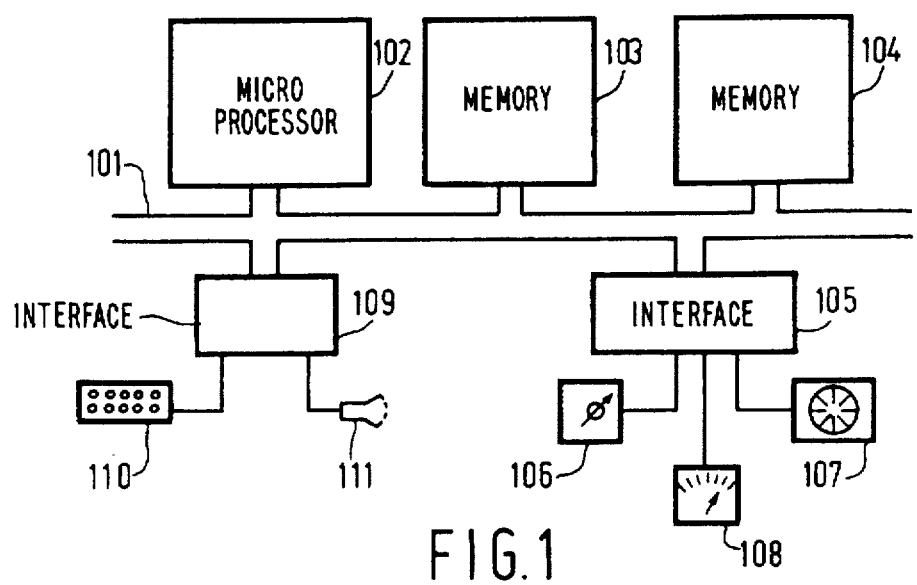
FIG. 1 shows a vehicle navigation system.

A first interface 105 connects the bus 101 to an electromagnetic compass 106, wheel sensors 107 and an odometer 108. The elements 106, 107 and 108 enable the system to determine the position of the vehicle by dead-reckoning in a known manner. Alternative or additional position transducers could be provided, of course, including receivers for satellite navigation or radio-beacon direction finding signals. A radio receiver (not shown) may also be connected for the reception of encoded traffic information signals.

A keyboard 110 and an output device 111 are connected to the bus 101 via a second interface 109. The keyboard is used by the user to enter starting position and destination information. The output device 111 provides information which may comprise a visual display and/or a speech output device, for supplying navigational instructions to the user.

An overview of such a navigation system is given by Thoone in the article cited above. The present description is chiefly concerned with the organization of the network database, so as to provide compact storage and efficient retrieval for route planning and so forth. Methods of route planning using such a database are known for example from EP-A1-0 360 075, cited above, and EP-A1-0 369 539.

The rate for reading data from a CD-ROM is approximately 150 Kbytes per second, and larger delays up to a second may be incurred when reading from widely-separated parts of the CD-ROM disc. Therefore, the database is divided into parcels and one or more parcels at a time are loaded into the working memory 3 whenever their data are needed by the microprocessor 2. With regard to the network database in the present embodiment, each parcel corresponds to a rectangular section of a road network. Methods for dividing a network into sections for compact storage and efficient retrieval are described for example in EP-A1-0 280 795. Each parcel may for example comprise a few sectors of the CD-ROM. Each such sector comprises approximately 2 Kbytes and corresponds to a frame ($\frac{1}{75}$ second) in the well-known CD-Digital Audio system.

Figure 2:
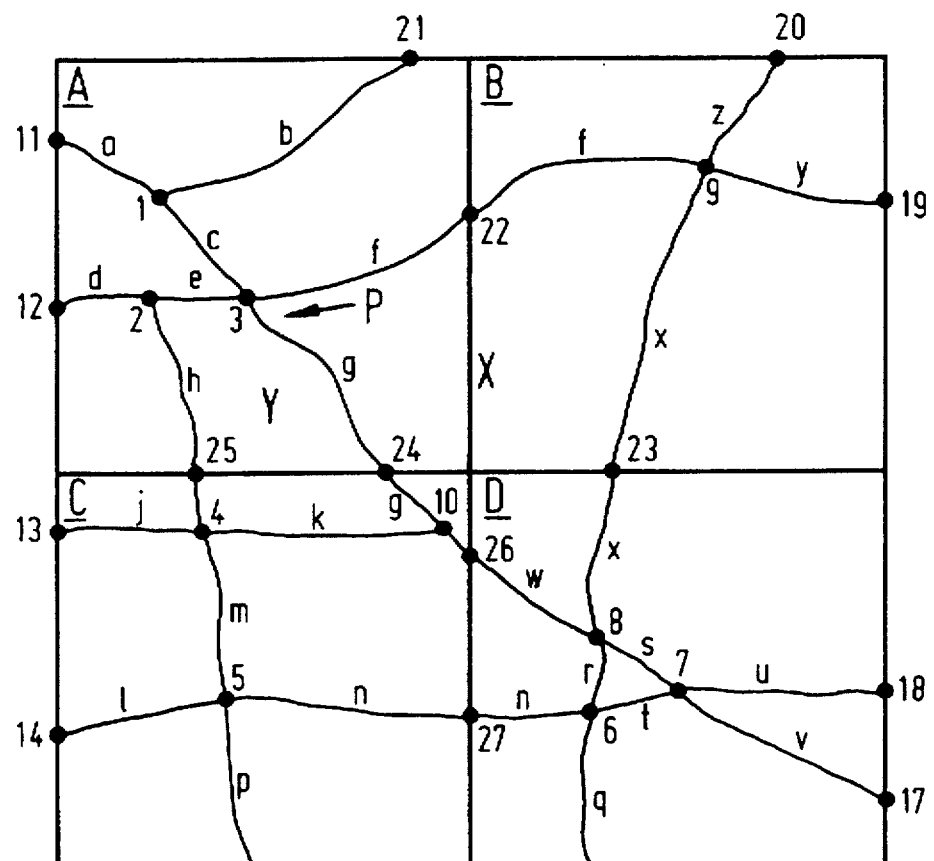
FIG. 2 shows an example of a road network for storage in a mass memory.

FIG. 2 shows an example of a topological network which has been divided into sections A, B, C and D for representation by respective parcels of a larger network database. The network of FIG. 2 is the same as one described in EP-A1-0 306 075, cited above, to facilitate a comparison of the presently proposed database organization with that known from the reference.

Nodes, referred to in topology as 0-cells, are indicated by reference numbers 1, 2, ... 27. "Real nodes" 1 through 10 represent road junctions in the network. Artificial "boundary nodes" 11 through 27 occur where a road segment is bisected by a section boundary. A real node may also be a boundary node, as described below with reference to FIGS. 5 and 6. Reference letters a, b, ... y, z indicate 1-cells of the network, which represent the segments of road joining the nodes of the network. Areas between 1-cells (road segments) are called 2-cells.

A data parcel to be stored for each section includes descriptions of the 0-cells, 1-cells and 2-cells of that section. A description of a 1-cell for example might include the name of the road and the type of road. To enable efficient navigation through the network, relational data are also to be stored. The relational data constitutes the topological definition of the network, including for example information that road segment e connects nodes 2 and 3, that node 22 in section A is the same as node 22 in section B, and that node 8 terminates road segments r, s, w and x. The efficient storage of this relational information, particularly as regards the section boundaries, forms the chief subject of the present disclosure.

The topological data for each section in the present embodiment comprises a chain list, having one record for each 1-cell in the section, and a node list having a record for each 0-cell in the section (including the boundary nodes). The principles of chain lists and node lists are known already from the article by Thoone and from EP-A1-0 306 075, both referred to above.

FIG. 3A to 3D show the chain lists for the sections A, B, C and D of the network of FIG. 2, while FIG. 4A to 4D show the node lists. Considering for example the chain list for section A (FIG. 3A), a first field "1-C" in each record (row) identifies the 1-cell (road segment) to which the record relates. In this column, FIG. 3 shows the reference letters a, b, ... h which identify the 1-cells relevant to section A. In practice, the field 1-C will contain pointers to locations in the data parcel where the remaining information describing that 1-cell is stored. That information could alternatively be stored in a further field of the chain list record, so that the complete description of 1-cell can be located by a single pointer value.

The remaining four fields of the chain list record relate to the ends of the 1-cell, and are grouped in two pairs L and R, corresponding to the "beginning" and "end" of the 1-cell respectively. For the sake of establishing a convention, the left-most end of a 1-cell is called the "beginning", while the right-most end is called the "end", hence the references L and R. In the case of an exactly vertical 1-cell, then the upper end may be chosen to be the beginning.

Under L, a first field 0-C identifies the beginning 0-cell for the 1-cell, and a thread pointer TP identifies a further 1-cell which terminates at the same 0-cell. Fields 0-C and TP under R do the same for the end node of the 1-cell.

In accordance with a principle described in EP-A2-0 302 547, the thread pointers are chosen systematically following a particular sense of rotation (clockwise, in this embodiment) about their respective 0-cells (nodes). This can be illustrated by the record for 1-cell c in the chain list A of FIG. 3. The beginning node for 1-cell c is node 1, as indicated under L, 0-C in the chain list record for which the field 1-C is "c". Another 1-cell joining 1-cell c at node 1 is the 1-cell a, as indicated by the thread pointer under L, TP. This 1-cell a was chosen because it is the first 1-cell at node 1 in a clockwise sense of rotation about the node 1, starting from the 1-cell c to which the record relates. All 1-cells terminating at node 1 can be found in this rotational order by following thread pointers TP under L or R until they point back to the starting 1-cell. Thus the record for 1-cell c points to 1-cell a, and the TP associated with node 1 in the record for 1-cell a points to 1-cell b. The TP associated with node 1 in the record for 1-cell b points back to 1-cell c, indicating that all 1-cells have been found which terminate at node 1.

In the node list of FIG. 4A, the record for node 1 (third row from the bottom) need only specify one 1-cell, by means of a thread pointer TP. In the example of FIG. 4A, 1-cell b is identified by the thread pointer, TP for node 1, and the remaining 1-cells, c and a, can be identified in the clockwise order by following thread pointers through the chain list (FIG. 3), as described above. For the sake of establishing a convention, the 1-cell indicated by the thread pointer in the node list record for a non-boundary node is chosen to be the first 1-cell in the clockwise sense of rotation, starting from the North (up) direction.

The use of a particular sense of rotation in allocating the chain-list thread pointers is not essential, provided that all 1-cells at a node are linked in a chain by thread pointers. The rotational ordering does however simplify processing for the in-car system when for example it is desired to identify all the 1-cells bounding a particular 2-cell, as described in EP-A2-0 302 547. It has been recognized in this context, that processing at the time of compiling the database can compress the database and, by use of ordering, can further increase the information content of a given volume of data. Such processing saves storage space in the CD-ROM and reduces the processing power and working memory required in the in-car system, providing a great cost and performance benefit to end-users of the database. Such techniques are particularly useful in association with a read-only storage device such as a CD-ROM. As the network changes by the addition of new roads and so on, the database can nevertheless be updated with special supplementary information until compilation of a new database on CD-ROM is justified. Such supplementary information could be supplied for example by local radio data broadcasts, or on magnetic disks or memory cards. For other databases, such as an on-line database for a telecommunications network, the compilation of a new database may be justified more frequently.

So far, the database organization as it relates to boundary nodes and associated 1-cells has not been described. The organization as described below with reference to FIGS. 3 to 6 exploits ordering in the compiled database to provide more information in less space than that achieved by the organization known from EP-A1-0 306 075, for example.

In the chain list records of FIG. 3, no attempt is made to point to 1-cells in neighbouring sections (data parcels) by means of the thread pointers TP under L or R. Instead, where a node field 0-C indicates a boundary node, and the next 1-cell in the clockwise sense of rotation is a 1-cell in the neighbouring section, a special pointer NIL (the "nil-pointer") occupies the thread pointer field TP. This can be seen for example in the chain list for section A in the record for 1-cell f, wherein the field 0-C under R indicates the boundary node 22, and the thread pointer field TP under R is the nil-pointer.

Now, the nil-pointer conveys no information other than that the associated node is a boundary node and the next 1-cell clockwise is not in the present section. In one sense there is less information in the chain lists of FIG. 3 than in the chain lists of the known organization. Against this, however, is a reduction in the necessary size of the thread pointer fields TP under L and R for all records in the chain list, since the 1-cells need only be identified uniquely within the current section. In other words, the information has been added to the chain list that all indicated 1-cells are within the current section.

It will be appreciated that in a practical database, with tens or hundreds of nodes in each section, the boundary nodes will be a minority of the total number of nodes. Therefore the space saved in the chain lists by adoption of the nil-pointer is greater than the information lost.

The lost information is replaced in the node lists of FIG. 4 by providing longer records for (only) the boundary nodes. In order not to disrupt the format of the node lists excessively, the longer records and the normal (non-boundary) node records are grouped in two separate node lists. Again, it should be remembered that these longer records will be a small minority in a practical database. For example, in the CD-ROM-based car navigation system described, a parcel size giving 12 to 18 percent boundary nodes has been found satisfactory. Each boundary node gives rise to at least two long records, since it appears in at least two neighbouring sections.

The additional field 0-C' in the record for a boundary node identifies a neighbouring section (A, B, C, D etcetera), and the node in that neighbouring section's node list which is the same boundary node. Thus, the field 0-C' in the record for node 25 in the node list for section A identifies node 25 in section C. The symbol "?" is used for neighbouring sections not shown in FIG. 2. Conversely, the field 0-C' for node 25 in the node list for section C refers to node 25 in section A. The situation where a boundary node appears in more than two sections will be discussed later, with reference to FIGS. 5 and 6.

The thread pointer field TP of each record for a boundary node in the node list points to the first 1-cell terminated by that node, counting clockwise from the section boundary. Thus, for example, traversing 1-cell f in section A, in the direction from L to R, one encounters the node 22 in field 0-C under R in the chain list record for 1-cell f. To continue the journey, one examines the thread pointer field TP under R in the chain list record for 1-cell f in section A. This thread pointer turns out to be a nil-pointer, so one looks to the node list record for the associated node 22. Field 0-C' in this node list record identifies the boundary node beyond the section boundary as being node 22 in section B. Turning to the node list for section B one finds the thread pointer field TP indicating 1-cell f of section B, which is indeed the desired continuation of 1-cell f in section A. The record for 1-cell f in the chain list for section B can then be used to continue following the route through section B of the network.

It may be noted that unique references 1 through 27 and a through z are given to the nodes and 1-cells in the entire network of FIG. 2 for the purposes of this description only. In the database itself, a node or 1-cell need only be identified uniquely within its own section (data parcel).

Figure 5:
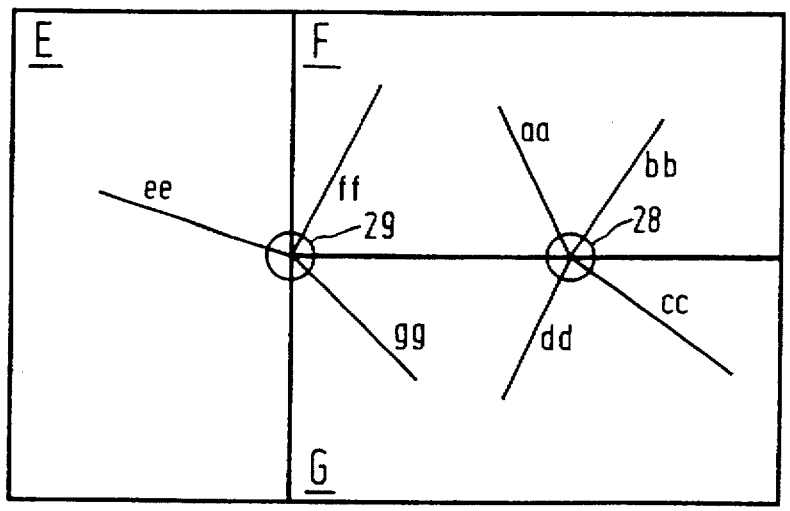
FIG. 5 shows another network in which real nodes and boundary nodes coincide.
Figure 6:
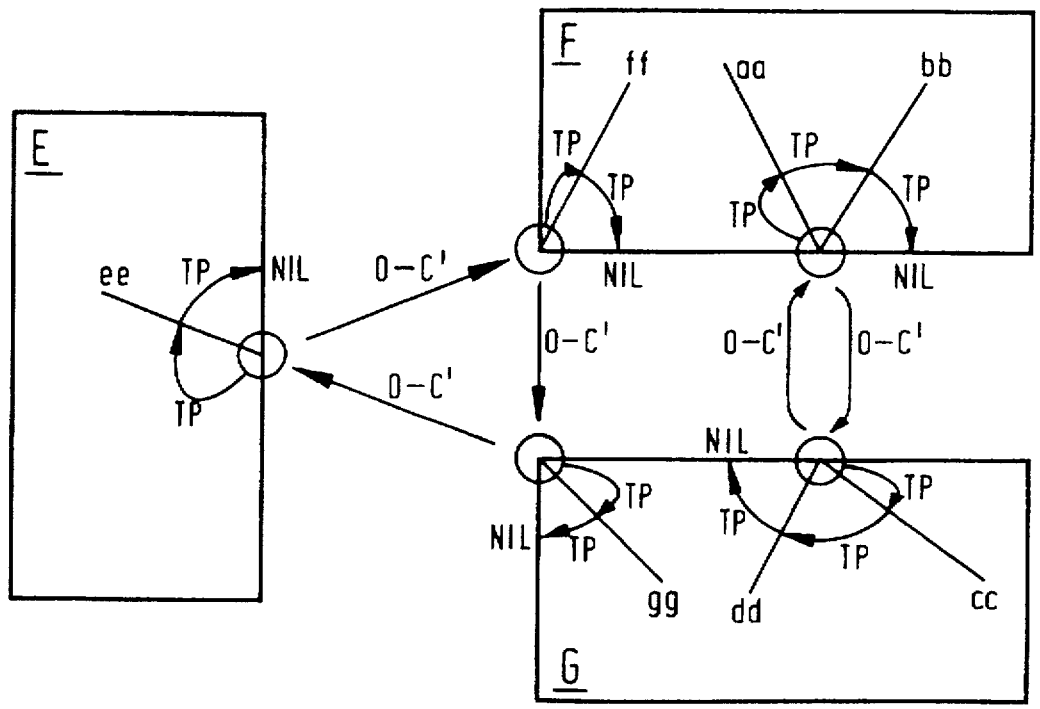
FIG. 6 illustrates the treatment of the network of FIG. 5 in a network database.

FIGS. 5 and 6 illustrate one system for treating a real node which coincides with the boundary between two or more sections. In FIG. 5, a small part of a network is shown, bridging three sections, E, F and G. At the boundary between sections F and G, a node 28 occurs, which terminates four 1-cells, aa, bb, cc and dd. Of these four 1-cells, aa and bb are in section F while cc and dd are in section G. A second node 29 coincides with the boundary intersection at which all three sections, E, F and G meet. Three 1-cells ee, ff and gg lead from this node into sections E, F and G respectively.

FIG. 6 illustrates a compact and systematic ordering of the chain list and node list references describing this network, which provides maximal consistency with the organization as described already, even at these unusual nodes 28 and 29. In FIG. 6, the three sections E, F and G have been separated, as indeed they are separated in respective parcels of the database. The reference signs for the 0-cells (nodes) 28 and 29 have been omitted for clarity, since these features are clearly recognizable by comparison with FIG. 5.

What are shown in FIG. 6 are the various pointers in the chain lists and node lists for the sections E, F and G which enable a route to be followed through the network rapidly and systematically, even across the section boundaries. An arcuate arrow labelled TP leading clockwise about a node from one 1-cell to another (as from aa to bb, or from cc to dd in FIG. 6) represents the thread pointer field TP of the record in the chain list (FIG. 3) for the first 1-cell (aa, cc), under L or R as appropriate.

When clockwise rotation about a node leads to a section boundary (as from 1-cell bb, for example) then the relevant thread pointer field in the chain list record for 1-cell bb contains the nil-pointer, as marked by the reference NIL in FIG. 6. There is therefore no information leading directly from the 1-cell bb in section F to the 1-cell cc in section G. There is, however, indirect information.

A pointer labelled 0-C' in FIG. 6, leading from a node 28 or 29 in a first section to its counterpart in a neighbouring section, is provided by the special field 0-C' of the record for the boundary node in the node list for the first section. For the boundary node in the neighbouring section a pointer labelled TP from the node to a 1-cell in the neighbouring section is provided by the field TP of the node list record for that node in the neighbouring section. For example, the field 0-C' for node 28 in the node list of section F points to the node 28 in section G, while the field TP for the node 28 in the node list of section C points to the 1-cell cc. The 1-cell cc is chosen because it is the first 1-cell leading from node 28 into section G, counting clockwise from the section boundary. Thus to get from 1-cell bb in the chain list of section F to the 1-cell cc is a two-step process of consulting the node lists for section F and then section G in response to the discovery of the nil-pointer in the chain list record for 1-cell bb in section F. The complete set of four 1-cells radiating from node 28 can be found in this manner, in the correct clockwise sequence aa, bb, cc, dd.

A similar situation applies to the node list and chain list records for node 29 in the three sections E, F and G. However, there are two possibilities for the pointer 0-C' in each section, since the record for node 29 in the node list of section E could refer to the node 29 in section F or in section G. It is proposed for the present embodiment again to order the choices according to the same particular sense of station as is used within the chain list itself, that is clockwise in this example. Thus the field 0-C' for node 29 in section E points to node 29 in section F, the field 0-C' in section F points to the node 29 in section G, and the field 0-C' in section G points to the node 29 in section E, completing the cycle. Thus, when following the pointers TP and 0-C' for the node 29 in the same manner as described above for node 28, the 1-cells ee, ff and gg will always be found in the clockwise order, just as if there were no boundaries at all.

In the case of rectangular sections, a boundary node might appear in 2, 3 or 4 different sections. For other-shaped sections, a node might appear in even more than 4 sections. The clockwise ordering system adopted at node 29 in FIG. 6 can be extended infinitely enabling a consistent approach to database organization at all real and boundary nodes.

Figure 7:
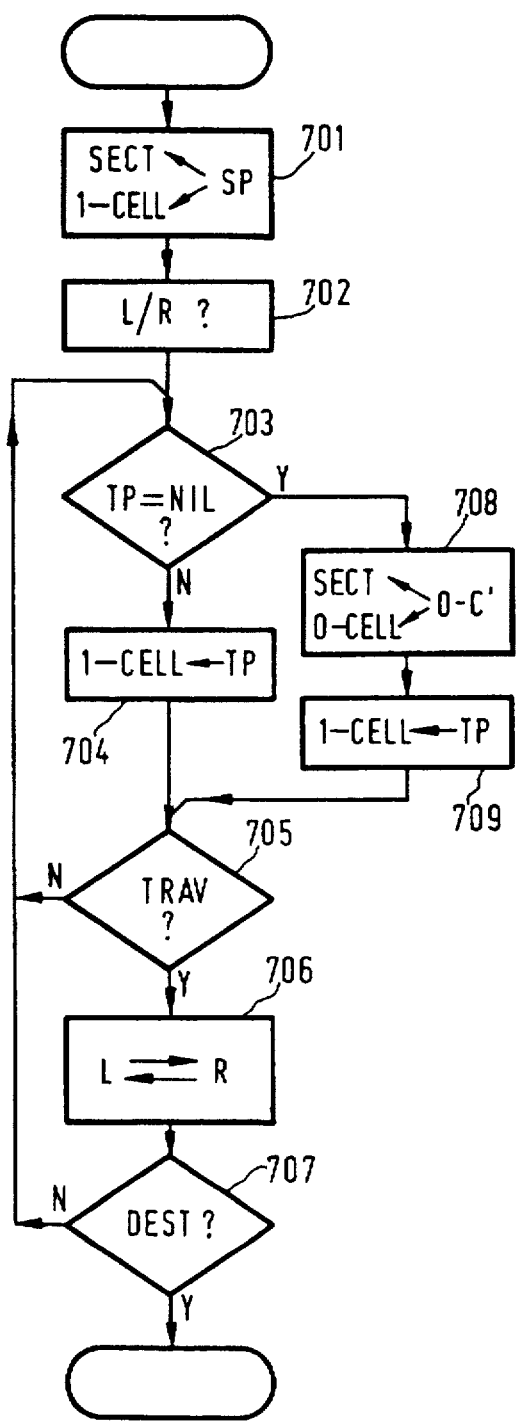
FIG. 7 illustrate tracing a route through a network.

The flowchart of FIG. 7 illustrates a method of tracing a route through a network which is stored in a database in the manner described above. Steps 701 to 709 of this method are described as follows. 701: SP is starting position. Identify current section and current 1-cell. 708: Identify direction of traversing 1-cell (towards the L node or the R node). 702: Is the chain list thread pointer at the node a nil-pointer? 704: If not, chain list thread pointer gives new 1-cell. 705: Should we traverse the new 1-cell (is it a part of our desired route)? If not return to 703, trying thread pointer for same node, new 1-cell. 706: If yes in 705, traverse new 1-cell to new node (from L to R or vice versa). 707: Is new node the destination? If not return to 703 with new node. If yes, end. 708: If yes in 703, node is boundary node. Field 0-C' in node list record gives new section, new node. 709: Thread pointer in node list record in new section gives new 1-cell. Continue with step 705 in new section.

A special case of path following occurs when it is desired to identify the chain of 1-cells that surrounds a particular 2-cell. When navigating a car, for example, the car many often deviate from the known network when it enters private land, or enters a newly-developed area not yet included in the database. In this situation, knowledge of all 1-cells surrounding the 2-cell is useful for detecting when and where the car returns to the known network.

With the database organization described above with reference to FIGS. 2 to 6, the problem of finding 2-cell boundaries is greatly simplified by the rotational ordering of 1-cells in the allocation of thread pointers, as described in EP-A2-0 302 547. Suppose, for example, that in the course of traversing the 1-cell g in section A, the car leaves the known road and enters the 2-cell containing the reference X in FIG. 2. All the 1-cells bounding the 2-cell X can be found by first looking toward node 24 on 1-cell g, and then following a path through the network, always choosing to traverse the first 1-cell indicated by the thread pointer according to the clockwise sense of rotation.

Figure 8:
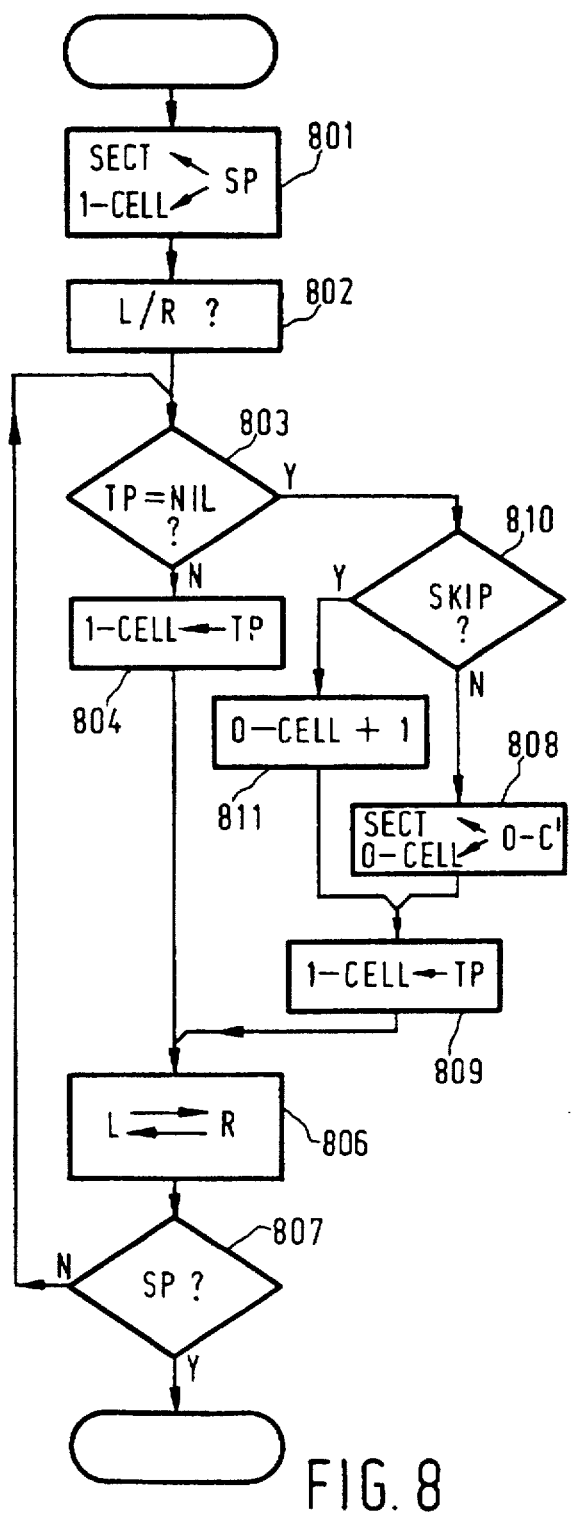
FIG. 8 is a special case of FIG. 7.

This special case of the method of FIG. 7 is represented by the flowchart of FIG. 8. Ignoring for the moment the steps 810 and 811, the steps 801 to 809 correspond in function to the like-numbered steps 701–109 in FIG. 7. Note however that there is no decision corresponding to step 705: the first 1-cell in the clockwise sense of rotation is always the desired one when tracing a 2-cell.

Further points to note in FIG. 8 are that the L or R decision in step 802 is based not on any actual direction of traversing the 1-cell, but on which 2-cell it is desired to trace. The 2-cell X in the above example requires looking toward node 24 on 1-cell g, and node 24 is the 0-cell under R in the chain list record for 1-cell g (FIG. 3, A). To trace the 2-cell referenced Y in FIG. 2, starting from 1-cell g in section A, it is necessary in step 802 to look to node 3, which is the 0-cell under L in the chain list record for the 1-cell g.

Step 807 indicates that when tracing the boundary of a 2-cell, the destination is the starting point SP. The steps 803, 808 and 809 enable 2-cells to be traced across section boundaries, in the same way as the steps 703, 708 and 709 in the general case of FIG. 7.

It will sometimes occur that a 2-cell is too large to be considered as a whole, or merely that most of it is not relevant. For example, if the car is currently at the point P in the network of FIG. 2, the parts of the 2-cell X which are in sections B, C and D are hardly relevant to the immediate navigation problem. It may be that the data parcels for these sections are not even in the working memory. A single 2-cell might in some cases extend through so many sections that loading them all into the working memory is impossible. In such cases, the 2-cell must be "clipped" to a more reasonable area, and the question arises whether the section boundaries can be used to simplify such clipping.

Taking the 2-cell X in section A as an example, if one starts from 1-cell f, then the system is already aware of the boundary node 22, and can follow the path via node 3 to 1-cell g (and in general through any number of 1-cells), until the boundary node 24 is reached. At this point, the system could notionally connect nodes 24 and 22 and arrive at the complete boundary of the 2-cell X, within the section A.

In a more general case, however, two problems remain. Firstly, one does not always begin with knowledge of a boundary node and heading in the direction appropriate to the desired 2-cell. It is not easy to trace the path in the reverse direction. Secondly, there is no guarantee that some other 2-cell does not project into section A across the boundary between nodes 22 and 24.

These problems are solved in the embodiment described by ordering the records for the boundary nodes in the node lists. In each node list A, B, C and D in FIG. 4, the boundary nodes are listed according to an anti-clockwise sense of rotation around the section boundary, that is the opposite sense to the clockwise order in which the thread pointers are chosen. By this means, when following a 2-cell boundary, the appropriate part of the section boundary can be included simply by skipping to the next boundary node (record) in the ordered boundary node list (FIG. 4). For example, when tracing the boundary of 2-cell X and arriving at node 24, the section boundary can be used to clip the 2-cell by skipping to the next boundary node in the node list for section A, which is node 22. Because of the anti-clockwise ordering of boundary nodes, it is known that no other 2-cell projects across the boundary between nodes 24 and 22. At node 22, the thread pointer TP in the node list record for node 22 in section A can be used to continue along 1-cell f. In the entire process there has been no need to consult the data parcels describing sections B, C and D.

The skipping action is represented by steps 810 and 811 in FIG. 8. In step 810, it is determined whether the area beyond the section boundary is relevant, or can be skipped. If it can be skipped, step 811 updates the current node to be the next one in the node list for the section. Of course, if the first boundary node is the last one in the node list (for example node 21 in section A), step 811 will look to the first record in the node list (node 11), rather than to the following, non-boundary node (node 1).

Rather than ordering the boundary node records in the node list, it would be sufficient of course that each boundary node record should contain a pointer to the next boundary node in the opposite (anti-clockwise) sense of rotation. Such a pointer occupies space, however, and the use of ordering exploits more fully the principle of concentrating the processing effort into the database compilation, thereby reducing the processing effort in the in-car system using the database.

Many variations of the described embodiments will be apparent to the skilled reader, and it will be further appreciated that the invention is applicable to a wide range of topological networks other than road networks, including for example other transport networks, telecommunications networks, and distribution networks for oil, gas, water etcetera.

We claim:

1. A computer-implemented method for arranging digital data representing a topological network in a memory, the network comprising a set of 0-cells (nodes) and a set of 1-cells and being divided into sections, a boundary node being defined at each point where the network traverses a boundary between sections, comprising:

storing discrete parcels of data corresponding to each section of the topological network in a mass memory;

for a given section, storing in the data parcel a chain list record for each 1-cell in the section and storing in each chain list record for a 1-cell terminating at a non-boundary node, a reference to a further 1-cell in the same section of the network terminating at the same node, such that no chain list record in a data parcel refers directly to a 1-cell outside the section of the network to which that data parcel relates.

2. A method as claimed in claim 1, comprising:

storing, in the data parcel for a given section of the network, a node list record for each node in the section; and storing, in the node list record for a boundary node in a given section, a reference to a corresponding node in an adjacent section, and a thread pointer referring to a 1-cell in the given section, but no direct reference to any 1-cell outside the given section.

3. A method as claimed in claim 2, comprising storing, in the chain list record for a 1-cell, references to a first and a second node which terminate the 1-cell and corresponding first and second thread pointers each indicating a further 1-cell terminated by the first or second node respectively, except that where a node referred to in a chain list record is a boundary node and no further 1-cell in the same section remains to be indicated, storing, in the space allocated for the thread pointer, a special pointer indicating that the node is a boundary node.

4. A method as claimed in claim 3 comprising choosing for inclusion the further 1-cell indicated by each thread pointer in a chain list record by following a particular sense of rotation about the terminating node and wherein the thread pointer in the node list record for each boundary node indicates the first 1-cell within the section, counting from the section boundary in the particular sense of rotation about the boundary node.

5. A method as claimed in claim 4 comprising: for a boundary node located on the boundary of three or more sections, choosing for inclusion the node list record to refer to the corresponding boundary node only in the section following next in the particular sense of rotation.

6. A method as claimed in claim 4 comprising including, in the data parcel for a section of the network, information linking the boundary nodes in accordance with a sense of rotation around the section boundary which is opposite to the particular sense of rotation according to which the 1-cells are indicated by the thread pointers in the chain list records.

7. The method of claim 1, further comprising identifying for processing a series of 1-cells forming a route through a topological network represented by the data parcels stored in the mass memory given a current 1-cell and direction of traversing that 1-cell, the method comprising repeatedly finding a further 1-cell by (a) selecting from the chain list record the current 1-cell the terminating node in the given direction of traversing the 1-cell; and (b) selecting for processing from that chain list record a reference to a further 1-cell leading from said terminating node;

wherein, in a case where the terminating node is a boundary node and, in step (b), the chain list record is found to contain to direct reference to a further 1-cell leading from the boundary node, a step (b1) is performed which comprises using information outside the chain list record to locating for processing a reference to a further 1-cell in an adjacent section of the network each time making a further 1-cell a new current 1-cell, and each time traversing the current 1-cell only if it forms a part of the desired route.

8. A method of identifying a further 1-cell, given a current 1-cell and a direction of traversing that 1-cell in a topological network section represented by a data parcel stored in a mass memory in accordance with claim 2, the method comprising the steps of:

(a) finding in the chain list record for the current 1-cell the terminating node in the given direction of traversing the 1-cell; and (b) looking in that chain list record for a reference to a further 1-cell leading from said terminating node;

wherein, in a case where the terminating node is a boundary node and, in step (b), the chain list record is found to contain no direct reference to a further 1-cell leading from the boundary node, a step (b1) is performed which comprises using information outside the chain list record to find a reference to a further 1-cell in an adjacent section of the network.

9. A method as claimed in claim 8, wherein the step (b1) comprises using the node list record for that node to identify the corresponding node in an adjacent section of the network and using the thread pointer of the corresponding node list record in a data parcel representing the corresponding node into the adjacent network section.

10. A method of identifying a further 1-cell, given a current 1-cell and a direction of traversing that 1-cell in a topological network section represented by a data parcel stored in a mass memory in accordance with claim 1, the method comprising the steps of:

(a) finding in the chain list record for the current 1-cell the terminating node in the given direction of traversing the 1-cell; and (b) looking in that chain list record for a reference to a further 1-cell leading from said terminating node;

wherein, in a case where the terminating node is a boundary node and, in step (b), the chain list record is found to contain no direct reference to a further 1-cell leading from the boundary node, a step (b1) is performed which comprises using information outside the chain list record to find a reference to a further 1-cell in an adjacent section of the network.

11. A method of identifying a series of 1-cells which bound a particular 2-cell in a topological networks stored in accordance with a method as claimed in claim 10, the method comprising the steps of:

(c) choosing a first current 1-cell which bounds the particular 2-cell and choosing a direction so as to pass around the 2-cell in accordance with a sense of rotation opposite to the particular sense of rotation and (d) using a method as claimed in claim 9 to identify a series of 1-cells, traversing the first 1-cell indicated by the thread pointer at each 0-cell until the first current 1-cell is reached again.

12. A method as claimed in claim 11, comprising the step, upon reaching a boundary node, of determining whether the part of the particular 2-cell lying beyond the section boundary is of interest and, if that part is not of interest, replacing the step (b) by a step (b2) which comprises identifying the next following boundary node on the section boundary, in accordance with the said opposite sense of rotation around the 2-cell boundary, and using the node list record for said next following boundary node to identify a further 1-cell of the series within the section boundary.

13. A mass memory device wherein are stored data parcels representing sections of a topological network, characterized in that the data are stored in accordance with a method as claimed in claim 1.

14. A device as claimed in claim 13 wherein the topological network is a road network and the mass memory device is a Compact Disc Read-Only Memory (CD-ROM).

15. An apparatus for reading a topological database stored in a mass memory device in accordance with a method as claimed in any of claims 1 to 6, the apparatus comprising:
- means for reading from a mass memory device a first data parcel representing a first section of a topological network;
- means for reading from the data parcel a chain list record corresponding to a 1-cell in the first section of the network, which chain list record, for a given node terminating the 1-cell, may or may not refer directly to a further 1-cell in the first section which is also terminated by that node;
- means responsive to the reading of a chain list record which does not refer directly to such a further 1-cell for using information outside the chain list record for the node to identify an adjacent second section of the network; and
- means for reading a second data parcel for the second section of the network and for using information in the second data parcel to identify a further 1-cell leading from the corresponding boundary node into the second section of the network.

16. A computer readable storage medium embodying a data structure for storing electronic map data, the electronic map being composed of a plurality of discrete parcels, each parcel comprising at least one 1-cell and at least two 0-cells, the data structure comprising:
- a plurality of respective chain lists, each respective chain list being for listing 1-cells from a respective one of the discrete parcels, each 1-cell being stored with an indication of 0-cells which are end points of the 1-cell, none of the chain lists containing any reference to any feature of any discrete parcel other than the respective discrete parcel; and a plurality of respective node lists, each respective node list being for listing 0-cells for a respective one of the discrete parcels, each 0-cell being stored with an indication of those 1-cells within the respective discrete parcel that are connected with that 0-cell, at least one of the 0-cells being also stored with an indication of a connection to a 0-cell outside the respective discrete parcel, none of the node lists containing any reference to a 0-cell outside the respective discrete parcel.

17. The medium of claim 16 wherein, at least one of the chain lists includes for a particular 1-cell, at least one thread pointer connecting that particular 1-cell to a second 1-cell via one of the end points of that particular 1-cell.

18. The medium of claim 17 wherein a plurality of thread pointers are listed for the particular 1-cell in a particular sense of rotation about the one of the end points.

19. The medium of claim 16 wherein, for a 1-cell located at a boundary of three or more of the discrete parcels, a node list record refers to a corresponding 1-cell only in the discrete parcel following next in a particular sense of rotation.

20. The medium of claim 17 wherein when the one of the end points is on a boundary of the respective discrete parcel for that particular 1-cell, the thread pointer indicates that the one of the end points is a boundary node.

* * * * *